(12) United States Patent
Twito

(10) Patent No.: US 10,614,105 B2
(45) Date of Patent: Apr. 7, 2020

(54) SYSTEM AND METHOD OF DESIGNATING DOCUMENTS TO ASSOCIATE WITH A SEARCH RECORD

(71) Applicant: BYCITE SOFTWARE LTD., Hod Hasharon (IL)

(72) Inventor: Israel Twito, Hod Hasharon (IL)

(73) Assignee: BYCITE SOFTWARE LTD., Hod Hasharon (IL)

( * ) Notice: Subject to any disclaimer, the term of this patent is extended or adjusted under 35 U.S.C. 154(b) by 256 days.

(21) Appl. No.: 15/512,565

(22) PCT Filed: Sep. 17, 2015

(86) PCT No.: PCT/IB2015/057167
§ 371 (c)(1),
(2) Date: Mar. 19, 2017

(87) PCT Pub. No.: WO2016/042514
PCT Pub. Date: Mar. 24, 2016

(65) Prior Publication Data
US 2018/0143985 A1      May 24, 2018

(30) Foreign Application Priority Data
Sep. 18, 2014 (SE) .................................... 1451100

(51) Int. Cl.
| G06F 16/00 | (2019.01) |
| G06F 16/332 | (2019.01) |
| G06F 16/248 | (2019.01) |
| G06F 16/9535 | (2019.01) |
| G06F 16/93 | (2019.01) |
| G06F 16/955 | (2019.01) |

(52) U.S. Cl.
CPC ........ *G06F 16/3322* (2019.01); *G06F 16/248* (2019.01); *G06F 16/3326* (2019.01); *G06F 16/93* (2019.01); *G06F 16/955* (2019.01); *G06F 16/9535* (2019.01); *G06F 2216/11* (2013.01)

(58) Field of Classification Search
CPC .............. G06F 16/90324; G06F 16/93; G06F 16/3326; G06F 2216/11
See application file for complete search history.

(56) References Cited

U.S. PATENT DOCUMENTS

| 7,103,714 | B1 * | 9/2006 | Jacobs | ................ G06F 16/9574 711/113 |
| 2003/0046307 | A1 * | 3/2003 | Rivette | ................... G06F 16/34 |
| 2010/0312764 | A1 * | 12/2010 | Liao | ..................... G06Q 10/10 707/723 |
| 2015/0026171 | A1 * | 1/2015 | Tanner | .................. G06F 16/248 707/728 |

* cited by examiner

*Primary Examiner* — Grace Park
(74) *Attorney, Agent, or Firm* — The Law Office of Joseph L. Felber

(57) ABSTRACT

A search tool is used to execute a method of designating documents to associate with a search session. The search tool opens a search session in response to a request received from a client computer. The search tool receives from the client computer an indication of documents. Then, the search tool uses storage to find information in storage that links the documents to other documents found in the storage. At that point, the search tool sends a suggestion to the client computer to associate the newly-found documents to the search session.

22 Claims, 10 Drawing Sheets

SYSTEM AND METHOD OF DESIGNATING DOCUMENTS TO ASSOCIATE WITH A SEARCH RECORD

BACKGROUND

Many enterprises begin with substantial investments directed toward developing inventions that will reap significant profits in the future. Frequently, competitors who have not invested comparable resources may copy the inventions with relatively little effort. Accordingly, the inventing enterprises often seek protection in the form of patents, which allow the enterprises to enforce a temporary monopoly relating to the inventions.

An applicant for a patent does not receive the patent until the patent application passes the thorough examination process of a jurisdiction's patent office, for example, the United States Patent and Trademark Office. An application may be rejected for any of a variety of reasons, for example, the invention as described in the claims is not "novel" (that is, the claimed invention already exists) or it is novel but it is "obvious" (for example, no special ingenuity caused the invention or there is no unexpected advantage associated with the invention). To reject a claim as lacking novelty or as obvious, the patent examiner must justify the rejection in a communication called an "office action." The office action must include a search report in which the "prior art," is referenced, that is, the document of the technology upon which the lack of novelty or non-obviousness rejection is based. Prior art may be issued patents of any country, published applications of any jurisdiction, non-patent documents (for example, a technical journal), public demonstrations, internet web pages, et cetera. In order to draft a search report the examiner must conduct a prior art search. In order to conduct a prior art search the examiner must use search engines. Different Search engines can be used. Some search engines have additional functionality of enabling the marking of documents and further export the marked documents. One such search engine is that provided by the European Patent Office (EPO). (See "My patents list" at http://worldwide.espacenet.com.)

Patent examiners are not the only searchers that conduct the prior art search. Although an applicant often has the opportunity to amend the claims to overcome the rejection, for example, to describe a feature of the invention that is not disclosed or even suggested in the prior art, the resulting patent is potentially stronger legally if the claims were originally in condition for allowance when the application was filed. Even though most patent applications are rejected at least once during examination, the resulting patent can be expected to fare better after the patent grant if the claim amendments during examination were more of a minimal nature.

Accordingly, patent attorneys regularly advise their clients to conduct prior art searches to enable the patent attorneys to draft better claims. Additionally, a prior art search may find documentation so close to a client's invention that very little claim scope would likely result from a subsequently issued patent. As unwelcome as such news is received by the client, it is preferable to be informed of the state of the art before substantial investment is made attempting to patent an invention and promoting the invention for the market. In another scenario, a "portion" of an invention is found in a prior art search, so the client and attorney work together to focus efforts on the part of the invention that has not been found. Such effort is also better invested early and before filing the patent application.

A proper prior art search is difficult to perform for someone without the proper skills and tools. A skilled searcher can find highly relevant prior art that an inexperienced searcher may never notice. As a result of the importance of a proper prior art search, specialized services have developed over the years which employ skilled searchers and equip them with the proper tools, such as access to both public and private prior art databases. Numerous algorithms are available to assist the searcher, and improved algorithms are continually being developed.

After the searcher determines which prior art to provide to the applicant, the searcher must present it in a fashion that easily directs the applicant's attention to the appropriate areas. For example, the most relevant part of a twenty page document may be five lines of text on the sixteenth page. Various applications for efficiently generating search records are also continually being developed.

Prior art searches are useful in other situations besides helping one decide whether to file a patent application and, if so, how to prepare it. For example, a party accused of patent infringement or assessing the risk of such accusation wants to know of prior art that may be applied to invalidate claims of the patent. In some limited situations, for an application for patent that is still pending, a party adverse to the grant of the patent may submit material prior art to a jurisdiction's patent office in the hopes that the patent office will reject the claims based on the submission.

It thus would be highly beneficial to equip a prior art searcher with efficient tools that enable him/her to quickly find the prior art that is most relevant (material) to a specific need.

SUMMARY

The present inventor has developed an invention that includes various mechanisms to aid the prior art searcher in providing the material prior art.

The invention may be embodied as a method of designating documents to associate with a search record, the method comprising: providing a search tool connected to a client device, a server and a database, wherein said search tool includes a collection tool and a suggesting tool; opening a search session by means of said search tool in response to a request received from a client device; storing a search record related to said search session; receiving from the client device an indication of a first set of one or more documents as basis for the search and for storing in said collection tool, said search tool using information from at least said database to find information that links at least one of the documents in the collection tool to one or more publications of a second set of documents; said search tool by means of a suggesting tool presenting a suggestion of said second set of documents to the client device, by means of the client device choosing one or more of the documents presented by the suggesting tool to enable associating one or more document of the second set with said collection tool.

The invention may also be embodied as a search tool for designating documents to associate with a search record.

The invention may further be embodied as a machine readable medium holding instructions that when executed activate a processor to execute the method of designating documents to associate with a search record.

The invention may further be embodied as a method of affiliating documents which are selected by a user during a search session, the method comprising: providing a search tool comprising: a collecting means operative to receive a set of at least documents IDs, a storage operatively connected to a processor and holding instructions that when executed activates the processor to use a database to store said documents IDs, characterized in that each unique document ID of said set, if not previously recorded in a session, is recorded as a new record in said database with the all other documents IDs from the said set, and that for each unique document ID of said set, that was previously recorded in a session, adding all the other documents IDs from said set. Said storage also holding instructions that when executed activates the processor to use a database upon request to retrieve said other documents IDs that were recorded with said unique documents ID.

Further aspect of the invention will become apparent from the description below, wherein Embodiments of the present invention are described in detail below with reference to the accompanying drawings, which are briefly described as follows:

BRIEF DESCRIPTION OF THE DRAWINGS

The invention is described below in the appended claims, which are read in view of the accompanying description including the following drawings, wherein:

FIG. 4 presents a flowchart that illustrates the process flow of a method of designating documents to associate with a search record according to an embodiment of the invention, which may be performed by the search tool of FIG. 3a;

DETAILED DESCRIPTION

The invention summarized above and defined by the claims below will be better understood by referring to the present detailed description of embodiments of the invention. This description is not intended to limit the scope of claims but instead to provide examples of the invention.

Figures 1, 2:
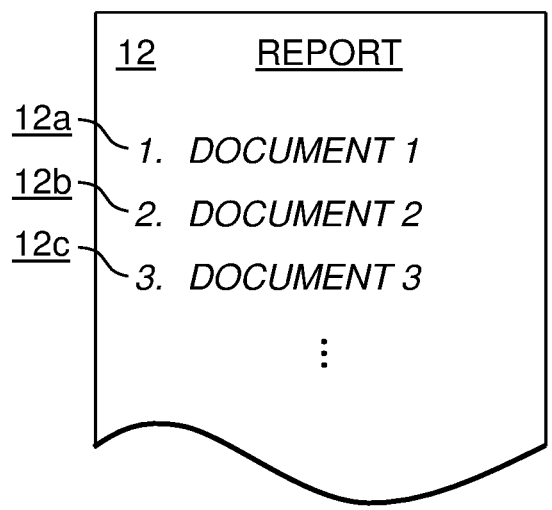
FIG. 1 illustrates a prior art search report.
FIG. 2 illustrates a search report provided by a governmental patent office.

Embodiments of the present invention find relevant documents for prior art search reports, such as the report 12 in FIG. 1. As illustrated, the report 12 lists multiple published documents 12a, 12b, 12c, . . . The documents 12a is an issued patent, the document 12b is a webpage, and the document 12c technical journal article. These are non-limiting examples of documents suitable for prior art search reports. Another example document is a newspaper article for the lay public, and the list of examples continues. Prior art search records that embodiments of the present invention produce are useful, as an example, for determining the aspects of an innovation upon which to focus when preparing a patent application (patentability studies) and for determining and/or challenging the validity issued patent claims.

Some patent applications, such as those published by the World Intellectual Property Organization (WIPO), the European Patent Office (EPO), and the Intellectual Property Office of the United Kingdom, typically include search reports, such as the example search report 14 illustrated in FIG. 2. For each listed document, the search report indicates the claims to which the document is relevant and the document's "category." A category may indicate for example that the cited document prevents the corresponding claim meeting novelty or inventive step requirements.

Figure 3A:
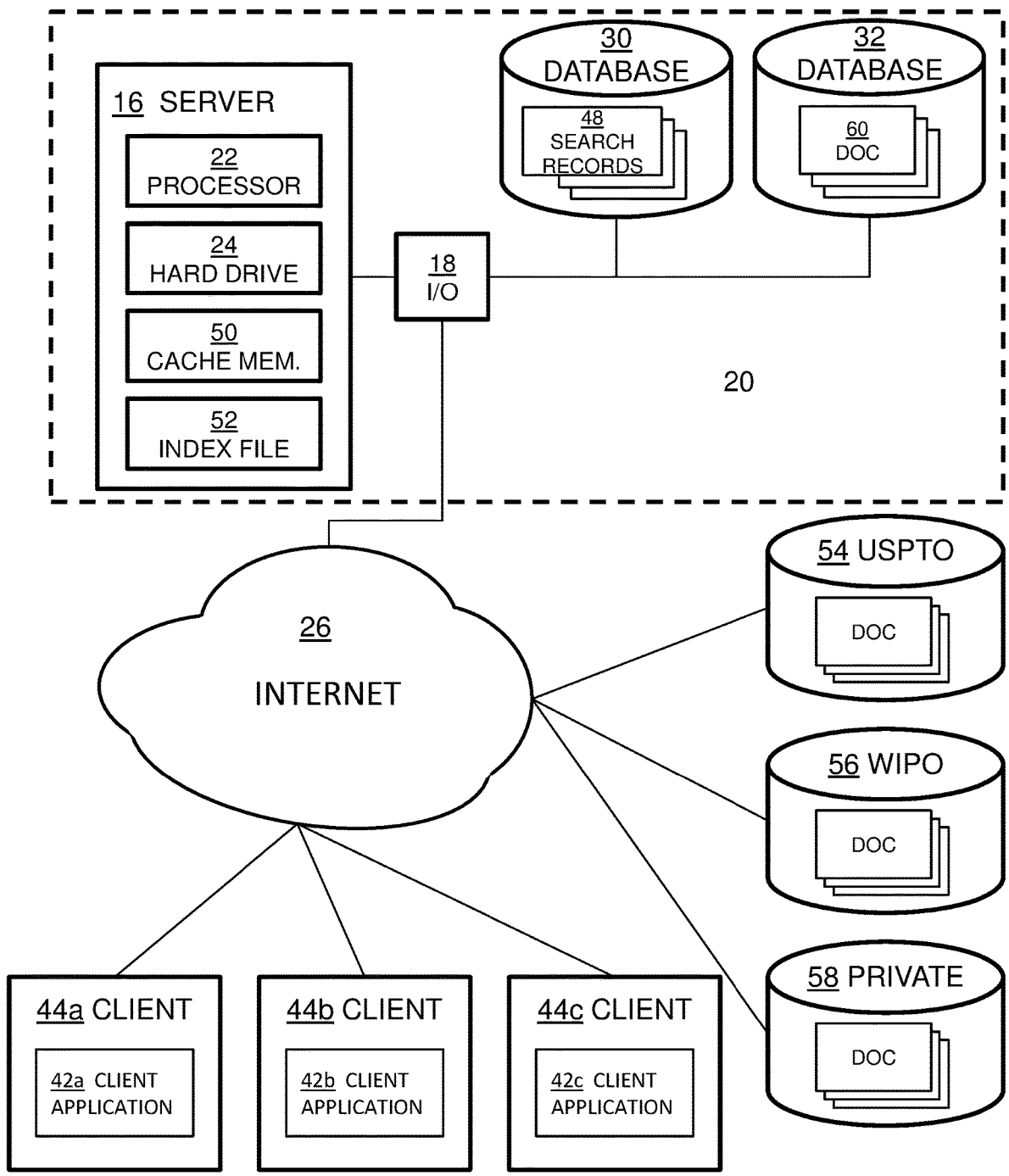
FIG. 3a illustrates diagrammatically the invention embodied as a search tool and the system in which the embodiment operates.

FIG. 3a presents a system including a server 16 with an input/output interface assembly 18 (the latter illustrated in the figure logically as a separate unit) embodying the invention as a search tool 20. The server 16 include a processor 22, such as an Intel® Core™ i5 or i7 processor, and a hard drive 24, such as a 250 GB hard drive. Example servers having such hardware include the Dell PowerEdge or the Hewlett-Packard ProLiant series. These example servers may be operated using Windows or Linux. In alternate embodiments, the functions performed by the server 16 may instead be performed by multiple servers, such as a service provided by a cloud computing solution. In this case, the servers work together under a common control with access thereto controlled by a single entity or by independent entities in the array of servers.

Figure 3B:
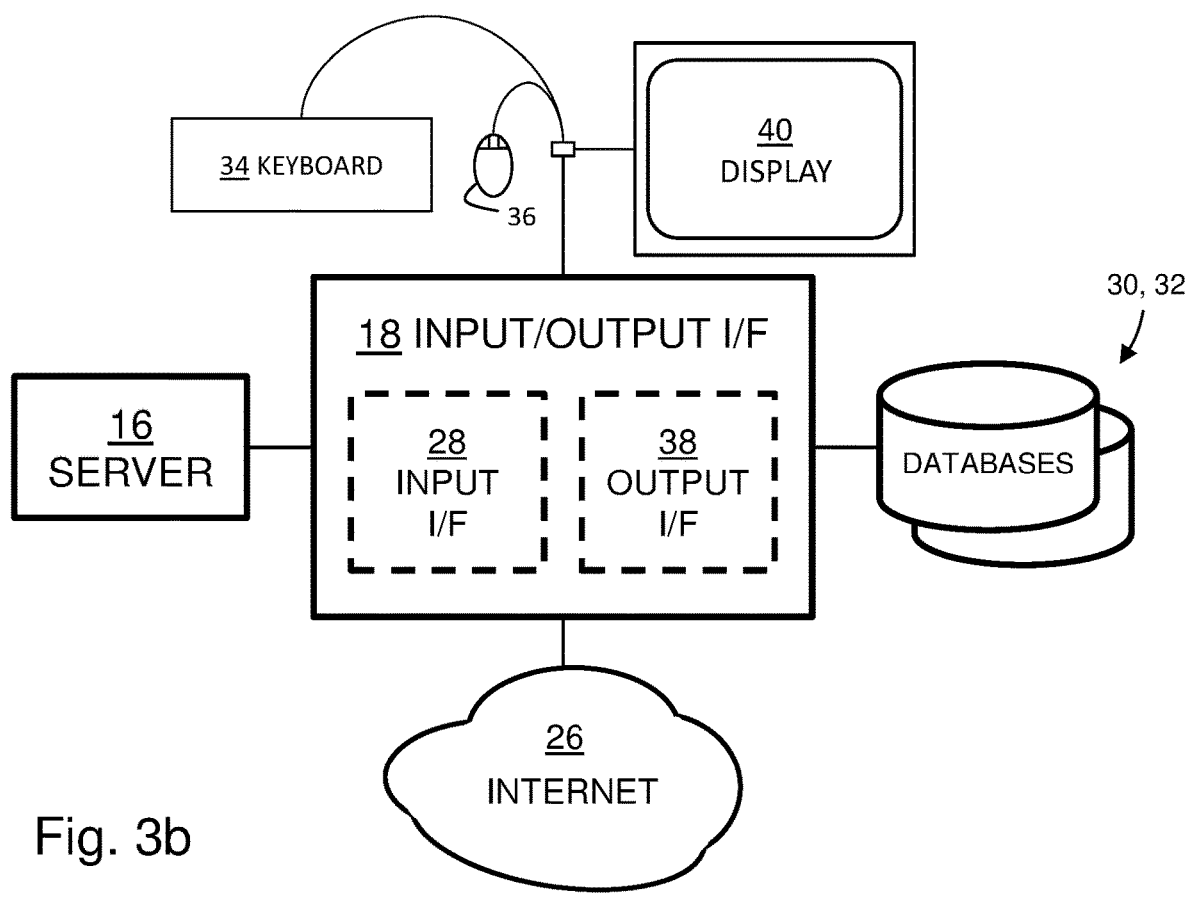
FIG. 3b illustrates diagrammatically in more detail the input/output interface assembly of the search tool of FIG. 3a and some of the components operating with the input/output interface assembly.

The input/output interface assembly 18 may be any suitable hardware that links a server to the Internet 26, including wired or wireless links to a modem as non-limiting examples. With reference to FIG. 3b, an input interface 28 is a subunit of the input/output interface assembly 18. The input interface 28 receives signals from the Internet 26, from databases 30, 32 maintained externally to the server 16 as discussed in more detail below, and from a server operator using a keyboard 34 and mouse 36 or other equivalent cursor movement device. The input interface 28 may include a USB and/or Ethernet socket(s) of the server 16. As also shown in FIG. 3b, an output interface 38 is another subunit of the input/output interface assembly 18. The output interface 38 transmits signals from the server 16 to the Internet 26, to the external databases 30, 32, and to a display 40 for the server operator to view during the course of performing his/her duties. The output interface 38 may include a VGA connector of the server 16.

A user endeavoring to conduct a search uses a client application, e.g. a web browser, such as a client application 42a, 42b, or 42c, residing on a client computer, such as a client 44a, 44b, or 44c, respectively, to establish communication with the search tool 20 through the Internet 26 and the input interface 28 as is known in the art in order to request that the search tool open a session. The clients 44a, 44b, 44c may be any suitable known personal computer (PC) or workstation, such as an IBM-compatible or Macintosh PC, tablet, smartphone, or the like.

Figure 3C:
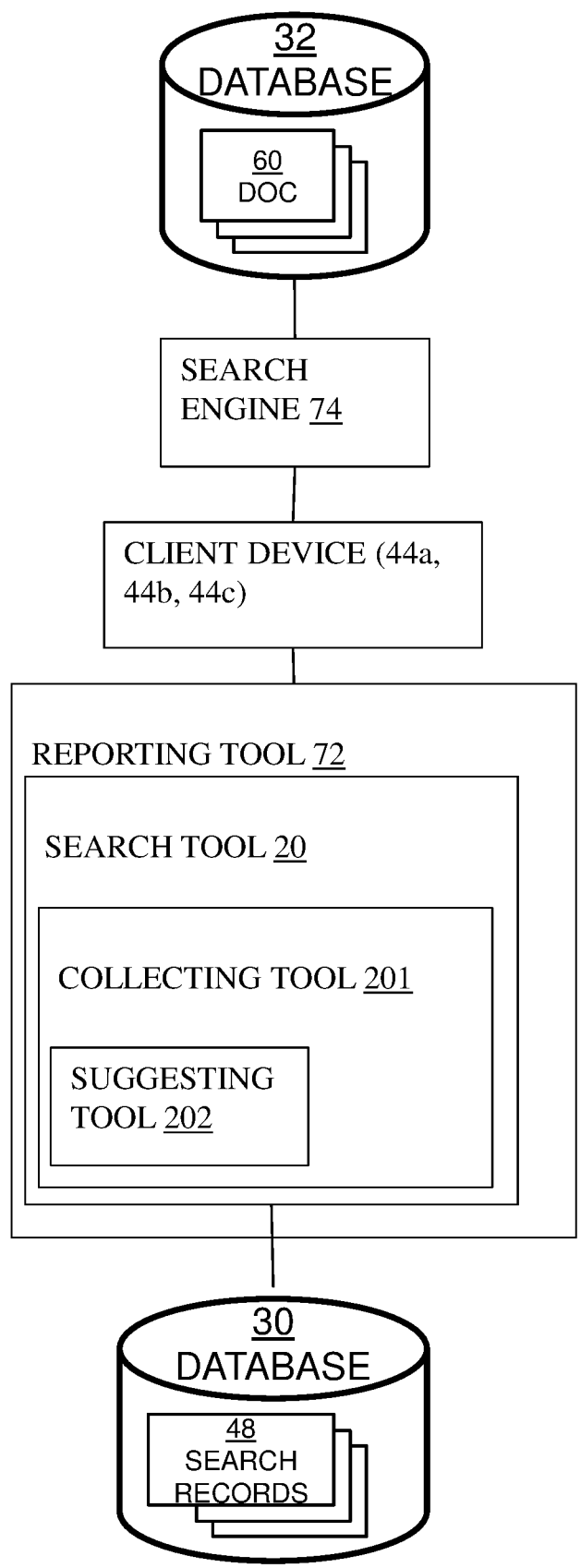
FIG. 3c illustrates diagrammatically the invention embodied as a search tool that is integrated with a reporting tool.

With reference to FIG. 3c, a user uses a search engine 74 such as www.espacenet.com to search a database 32 such as the INPADOC collection. During his search the user find documents which are relevant for the search and that he would like to deliver to a third party. For the delivering the user uses a reporting tool. The reporting tool 72 includes a search tool 20. The search tool 20 comprises a collecting tool 201 and suggesting tool 202. The search tool includes or connected to a database 30 in which search records are recorded. The reporting tool might also include additional database or it might share the same database 30 with the search tool. Said additional database can be used for storing other related data such as user related date, search records related data and documents related data. In some embodiments, the information from the additional database, if available, might also be used by the search tool. The user is exporting the relevant document from the search engine and imports them to the reporting tool. The exporting and the importing might be done one by one manually by the user or, in case that the separate systems allow it, in a more automatic way like exporting to a file format that can be read by the reporting tool or via a communication link with the use of an API between the search engine and the reporting tool.

Figure 3D:
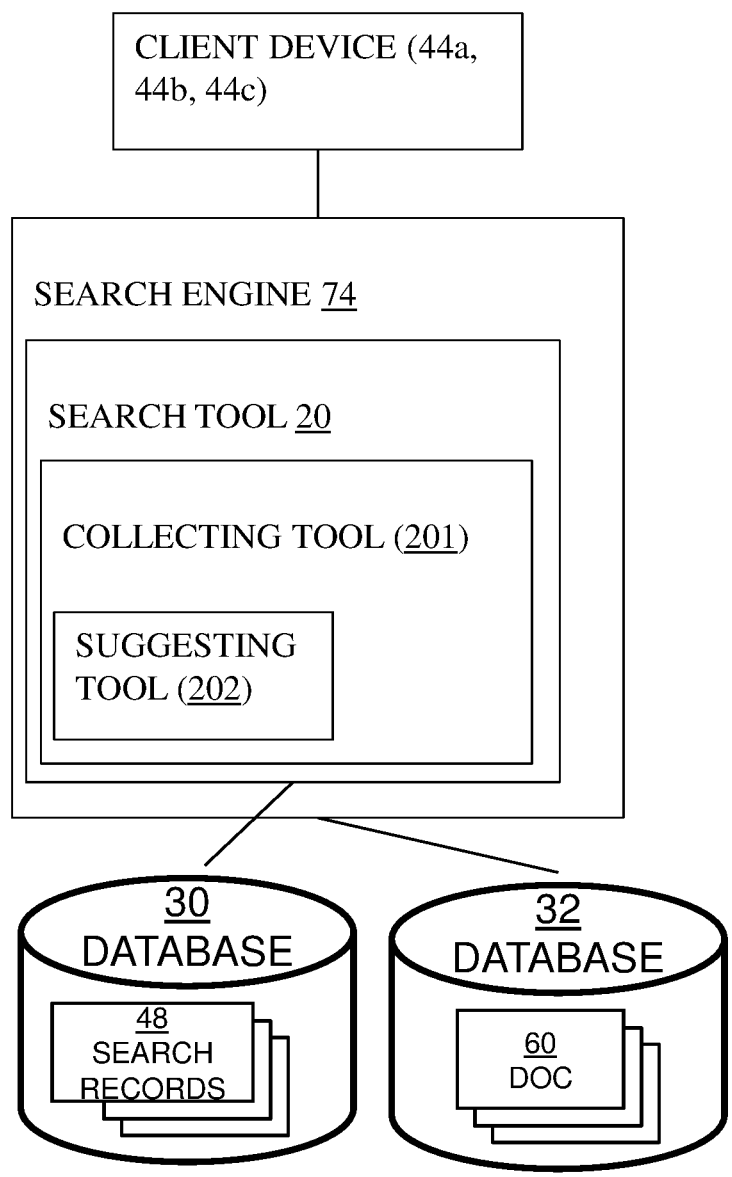
FIG. 3d illustrates diagrammatically the invention embodied as a search tool that is integrated with a search engine.

With reference to FIG. 3d, a user uses a search engine 74 such as www.espacenet.com to search a database 32 such as the INPADOC collection. During his search the user finds documents which are relevant for the search and that he would like to mark. For the marking the user uses a search tool 20. The search tool 20 comprises a collecting tool 201 and suggesting tool 202. The search tool includes or connected to a database 30 in which search records are recorded. In some embodiments, the information from the database 32, if available, might also be used by the search tool.

The embodiment of which the search tool is part of a search engine will be illustrated below by an example.

A first user collects (e.g. by marking) a first set of documents during his single search session, the search session is recorded in a database.

Then a second user collects a first document which is one of the documents that the first user collected, then the second user should be suggested to add to his collection also the other documents that were collected by the first user with the first document in said recorded search session of said first user.

A single search session is a session between actions that are activated on the set of documents that were collected.

More particularly a single search session is a session between actions that are activated on all (or most of) the documents that were collected.

Said actions are one of export, save, share, clear, copy and/or print.

EXAMPLE 1

In Which the Search Tool is Integrated to Espacenet Search Engine

1. User A searches espacenet for a shoe with embedded GPS.
2. His query:
   txt=(gps and footwear)
3. The result gives a list 17 documents
4. Document 2 (US2013043994), document 3 (CN202496481) and document 13 (U.S. Pat. No. RE41,122) from the result list found to be relevant for what User A searched for and therefore he collects (i.e. marks) them by clicking the gray star which becomes red after the click.
5. espacenet saves a cookie on the user computer. Its content (can be retrieved from the browser): US2013043994A1*D-preview-enEP_CN202496481U*D-preview-enEP_U.S. Pat. No. RE41,122E1*D-preview-enEP
6. The Cookie represents all the information that is needed in order to build the knowledge base.
7. User A wants to search espacenet for a new invention—a chair. Before he collects new documents he clears the previous list. The clearing action is used by the collecting tool as an indication of a search session that ended and needs to be recorded before the clearing takes place.
8. User B searches espacenet for a shoe with embedded GPS.
9. His query:
   txt=(gps and shoe)
10. The result gives a list 71 documents
11. Document 35 (CN202496481) from the result list found to be relevant for what User A searched for and therefore he collects it by clicking the gray star which becomes red after the click.
12. US2013043994 and U.S. Pat. No. RE41,122E1 should be suggested to User B because they were marked by user a in the same recorded session with CN202496481.

Notes about the above example:
a. In espacenet, there is a single list that is saved (as a browser cookie) on the client side but in other systems multiple lists are saved and on the server side.
b. User B might be User A in a different session.
c. Users in Espacenet can view the list of marked document. They can also export the list, clear it, print it etc.
d. If User A started a new search on a different invention it is assumed that he will execute an action on the whole list. e.g. export, print, clear etc.
   A list that was exported/printed/saved can be treated in the system as a search session that is worth saving for the use of other users, i.e. as row in the database with a session ID and documents IDs.
e. Metadata can be added by users (e.g. tags) or be found in the search engine (e.g. classification) for each document or for each session. This metadata can also be used in order to suggest documents.

Figure 4:
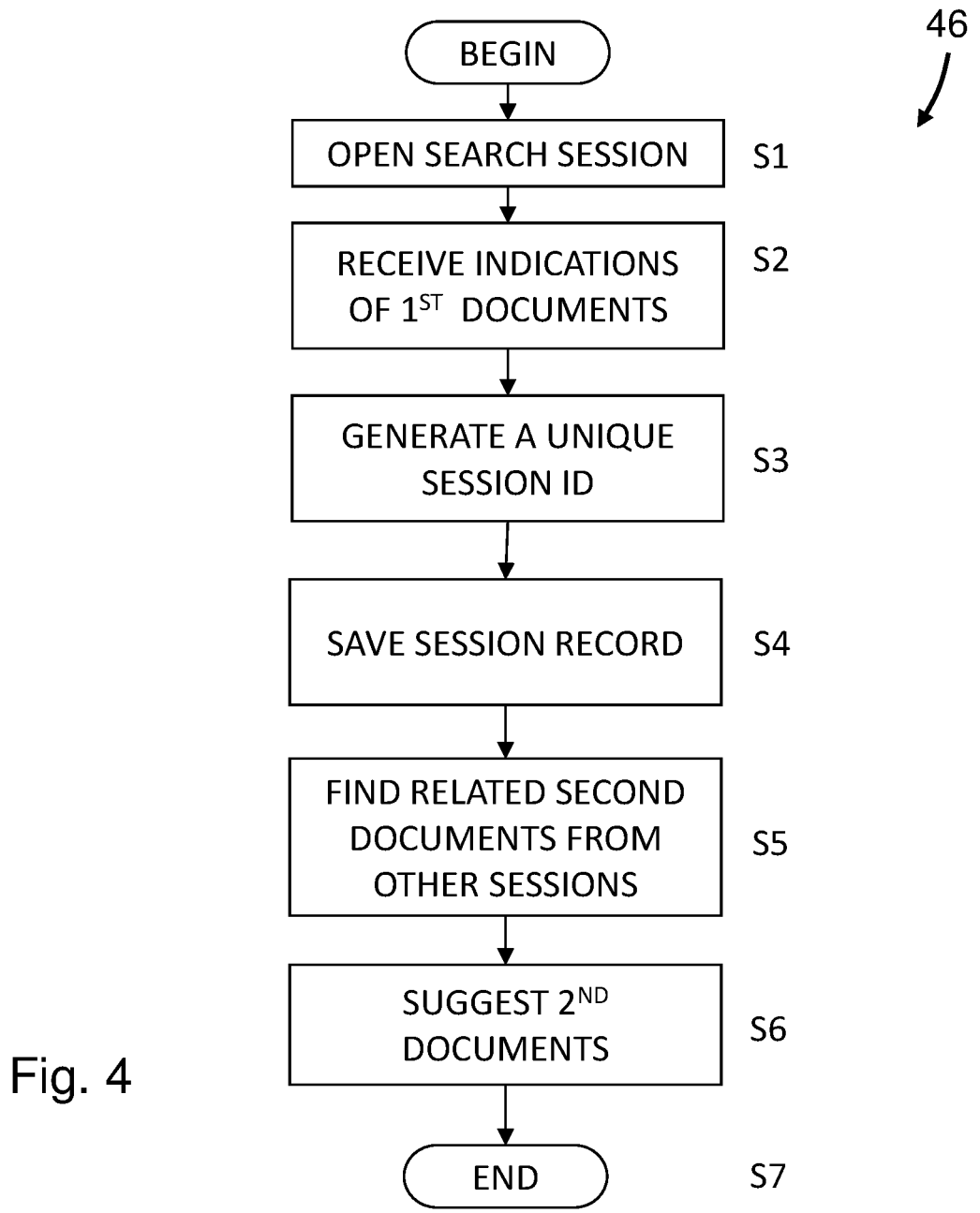

The search tool 20 assists the user in conducting a search by operating according to the following method:

FIG. 4 presents a flowchart 46 representing the process flow of a method of designating documents to associate with a search record according to an embodiment of the invention. The method may be executed by the search tool 20 of FIG. 3*a*.

The first step of the method is to open a search session in response to a request received from a client computer, such as client 44*a*, 44*b*, or 44*c* of FIG. 3*a*. (Step S1.) As discussed above, a user operates a client application, such as a client application 42*a*, 42*b*, or 42*c* residing on a client computer, to send a request to open a search session. In the system of FIGS. 3*a* and 3*b*, the server 16 receives the request from client computer 44*a*, 44*b*, or 44*c* via the input interface 28 of input/output interface assembly 18, and the processor 22 opens the search session.

The term "open" in this context covers the scenario in which the search record referenced by the client application 42*a*, 42*b*, or 42*c* already exists and is stored for example in the database 30 implemented to maintain search records 48. The term "open" in this context includes the retrieval of the search record from the location where it is stored.

Also for this embodiment, "open" in the context of a search record that does not pre-exist in storage before executing step S1 refers to creating at least a temporary record for the session, in response to the request from the client computer to open a search session. The record is then saved in storage, such as in the hard drive 24, in the database 30, or in another storage device.

In some implementations of the present embodiment, the server 16 includes a cache memory 50 and/or an index file 52 to provide more efficient retrieval of search sessions data. Completed search session records may accumulate in the database 30, while a search session in an initial stage, perhaps embodied as little more than list of documents on a web page showing a list of documents (even a list has not yet or may never be given to another party), may be stored automatically on the cache memory before later being stored (more permanently) in the database 30 and then erased from the cache memory 50 at the end of a search session.

Although only a couple types of searches are listed above, embodiments of the invention may produce other types of searches. For example, in the patent context, searches may also be conducted to determine the state of the art, to determine freedom to operate, and to search for invalidating prior art (as non-limiting examples). Another example search is a periodic (such as monthly) search that lists applications assigned to a particular party (such as to a competitor) that were published during a specified time period (such as the preceding month). Still another example is a periodic search that lists newly granted patents and/or newly published application that recite a particular phrase (such as "green energy"). In an academic context, the search tool may be used in a research tool to search relevant documents on a particular subject. In a business context, the searches tool may be used for market research.

As discussed above, in the present embodiment the client 44*a*, 44*b*, or 44*c* communicates with the search tool 20 through the Internet 26, but in alternate embodiments a client may communicate with a search tool through a different network, such a local area network (LAN) perhaps maintained within an organization in which the organization's employees operate the client computers to conduct search sessions. In still other embodiments a client application residing on a computer may interact directly with search tool software (discussed in more detail below) that resides on the same computer. Thus, in terms of Step S1, the opening of the search session is essentially in response to a request generated within the same computer.

The next step of the present method is to receive from the client computer an indication of a document, which will be referenced also as a "first document" in the present disclosure. (Step S2.) In the system of FIGS. 3*a* and 3*b*, the server 16 receives the indication from the client computer 44*a*, 44*b*, or 44*c* via the input interface 28 of input/output interface assembly 18. A user indicates a document that he/she wants to be collected in the search. If the document is an issued patent or patent application, the user may indicate the document by sending the patent or application number from a client computer through the Internet to a server execute the presently described process, as a non-limiting example. A user may indicate an article of a technical journal by sending a unique identifier of the article, such as the Digital Object Identifier (DOI) or the uniform resource identifier (URI). Other examples of identifiers include but are not limited to an International Standard Book Number (ISBN) or an International Standard Recording Code (ISRC). The article identifies may have a formatted style, such as those of the Modern Language Association (MLA), American Psychological Association (APA), or Chicago Manual Styles so a machine will be able to index and retrieve it. A user may also indicate a document with only a mouse click. In the embodiment that is illustrated in FIG. 3*d* the collecting tool is integrated into a search engine. Selecting a document from the result list in the search engine will be communicated to the collecting tool as an indication of said document.

In the present embodiment, a client indicates a single document as relevant, and the system suggests related documents to include in the search session, as discussed below. In alternate embodiments, though, multiple documents are indicated as a first set of documents as relevant documents, and one or more documents relating to the first set of documents are suggested for the search session.

In some scenarios, the user in step S1 opens a search session that preexisted and already includes a document that the user wants as the subject of the future steps. That is, the user wants the search tool to suggest additional documents relating to the first document, as with the passage of time more relevant documents become available that could not have been suggested previously. Accordingly, indicating the first document in this situation does not require the user to enter a document name, number, or code, because he/she may simply select an entry presented in a web page provided by the search tool. (In an alternate scenario, the user wants suggestions of similar prior art. The first document is "indicated" nonetheless.)

After the search tool receives the indication of the document (or set of documents), the search tool generates a unique session ID (Step S3.) and optionally saves the session record (Step S4.) Said session ID will be used as reference for the search session in the database and the document that will be found will be associated with it in the database.

From technical perspective and for the simplification of the discussion:

A database most often contains one or more tables.
Tables contain records (rows) with data.

EXAMPLE

| Column name | Column name | Column name | Column name |
|---|---|---|---|
| value | value | value | value |
| value | value | value | value |

For simplification we can say that the basic search sessions are recorded like this:

| session ID | Document ID | Document ID | Document ID |
|---|---|---|---|
| PT0000001 | U.S. Pat. No. 1,234,560 | U.S. Pat. No. 1,234,561 | U.S. Pat. No. 1,234,562 |
| PT0000002 | U.S. Pat. No. 1,234,560 | www.google.com | U.S. Pat. No. 1,234,563 |

In the above table the session IDs are unique. Alternative equivalent table might be with unique documents IDs:

| Document ID | session ID | session ID | Session ID |
|---|---|---|---|
| U.S. Pat. No. 1,234,560 | PT0000001 | PT0000002 | |
| U.S. Pat. No. 1,234,561 | PT0000001 | | |
| U.S. Pat. No. 1,234,562 | PT0000001 | | |
| U.S. Pat. No. 1,234,563 | PT0000002 | | |
| www.google.com | PT0000002 | | |

Either way, a user device that needs to retrieve a session sends a request with the session ID and receives all the documents that are recorded associated with that session ID.

A session record can also be recorded without a session ID

In this case session records cannot be retrieved after the session is finished and the only information that will be saved is the linking information.

Looking in the example above:

| Document ID | Document ID | Document ID |
|---|---|---|
| U.S. Pat. No. 1,234,560 | U.S. Pat. No. 1,234,561 | U.S. Pat. No. 1,234,562 |
| U.S. Pat. No. 1,234,560 | www.google.com | U.S. Pat. No. 1,234,563 |

The session can be recorded like this:

| Uniqe Document ID | Document ID | Document ID | Document ID | Document ID |
|---|---|---|---|---|
| U.S. Pat. No. 1,234,560 | U.S. Pat. No. 1,234,561 | U.S. Pat. No. 1,234,562 | www.google.com | U.S. Pat. No. 1,234,563 |
| U.S. Pat. No. 1,234,561 | U.S. Pat. No. 1,234,560 | U.S. Pat. No. 1,234,562 | | |
| U.S. Pat. No. 1,234,562 | U.S. Pat. No. 1,234,560 | U.S. Pat. No. 1,234,561 | | |
| U.S. Pat. No. 1,234,563 | U.S. Pat. No. 1,234,560 | www.google.com | | |
| www.google.com | U.S. Pat. No. 1,234,560 | U.S. Pat. No. 1,234,563 | | |

That means that for each document that was ever collected in a session there is a list of other documents that were collected with it at sessions. And each session recording is not done by adding a row to the table but by adding Document IDs to rows with a unique other document IDs.

The search tool then uses the database, or any other kind of storage to find information that links the document (or set of documents) to one or more other documents (a "second set" of documents) from other session. (Step S5.) The storage used to find the information could be a hard drive, cache memory, and/or index file, of a server embodying the search tool, or one or more database that the server accesses. In the example of the server 16 of FIG. 3*a*, the storage may be the hard drive 24, the cache memory 50, the index file 52, the session records database 30, and/or the document database 32, which stores documents 60. The invention is not limited to such storage, though. For example, the server 16 may access through the Internet 26 relevant information in databases maintained by the United States Patent and Trademark Office (PTO) (illustrated as database 54), by the World Intellectual Property Organization (WIPO) (illustrated as database 56), and/or privately maintained databases (illustrated as database 58) that may or may not require a subscription for access. The information may be formatted as one or more database records. Example ways in which documents are linked to each other include: (1) one patent listing another in its "references cited" section; and (2) a scientific document listing another scientific document in its bibliography. Linking may also occur if multiple search sessions list the same two documents, as will be discussed in more detail below.

The storage of one or more of the present embodiments may be referenced logically as a first storage and a second storage. The first storage, for example, within the hard drive 24 in FIG. 3*a*, is connected to the processor of a search tool and holds instructions that activate the processor to find information that links documents. The second storage, for example, within one or more of the databases 30, 32, 54, 56, and 58, the cache memory 50, and/or the index file 52 store the linking information. The second storage may even be embodied within the hard drive 24; thus, the hard drive 24 may provide both the first and second storage.

After the search tool finds information that links the first document to a second document (or set of documents), the search tool sends a suggestion to the client computer to include the documents of the second set in the search collection. (Step S6.) In the system of FIGS. 3*a* and 3*b*, the server 16 sends the suggestion through the output interface 38 of the input/output interface assembly 18 and then through the Internet 26 to a client application 42*a*, 42*b*, or 42*c* of the client computer 44*a*, 44*b*, or 44*c*, respectively. (The user of course ultimately decides whether he/she wants to further collect a second document.) The process of this embodiment then ends.

Steps S1-S6 of the method of the flowchart 46 may be executed by the search tool 20 of FIG. 3*a*. Alternatively, the method may be executed so that a first party performs the opening the search session, the receiving from the client computer, and the sending the suggestion, and an independent second party hosts the storage and performs the using the storage according to instructions from the first party. In such an arrangement, a first party may operate a server to host a search tool and "outsource" to or rely upon an independent party to maintain a database for the search tool to access.

Figure 4A:
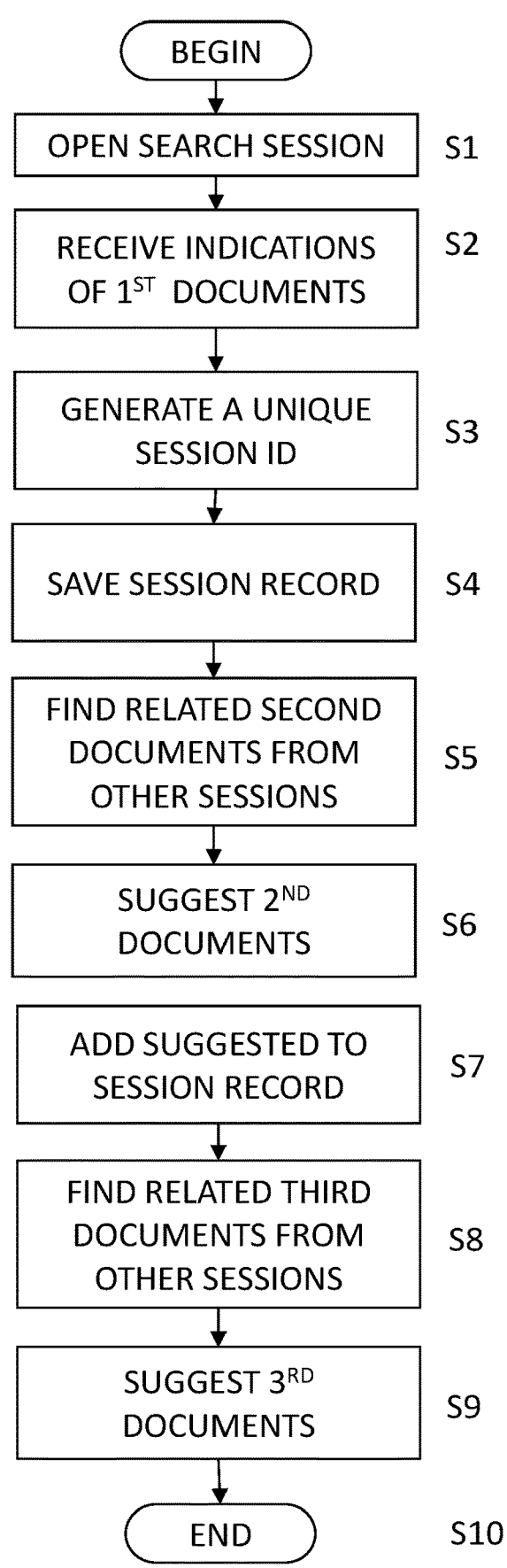
FIG. 4a presents a flowchart that illustrates the process flow as in FIG. 4 with further steps of associating the designated documents and reiterating the search for other documents to designate.

FIG. 4*a* presents a flowchart 47 which is representing the process flow of a method of designating documents to associate with a search record according to another embodiment of the invention. The process is similar to the process that was illustrated in FIG. 4 but with additional iterating steps (steps S7-S9). In step S7 the user associates at least one of the suggested documents to the search session. In step S8 said associated documents are considered as part of the collection of the session and therefore additional documents, third set, need to be found. The search tool finds information that links the first set combined with the selected documents out of the second set with a third set. Said third set is suggested in step S9. More iterations can be executed, as needed, in the same way.

The search tool may execute one or more of a multitude of processes for using the database to find information that links documents to each other. The following describes examples of those processes. The scope of the invention is not limited to the examples presented.

Figure 5A:
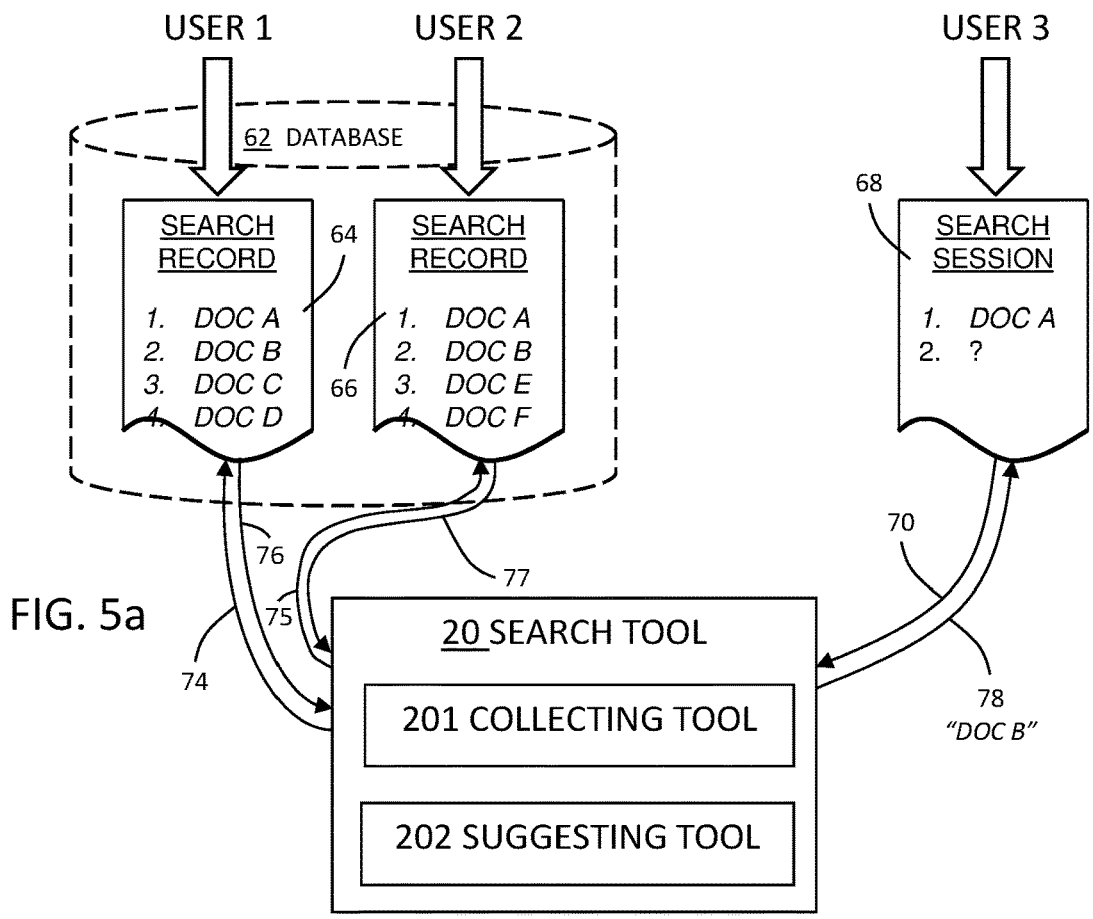
FIG. 5a illustrates the interaction of an embodiment of the search tool with a user and storage while implementing a first linking process in which documents from the first set are recorded with documents of the second set in other sessions.

The first linking process for using the database to find linking information is described with reference to FIG. 5a. In this process documents from the first set are recorded with documents of the second set in other sessions;

In this example, the storage is a database 62 holding search records of searches that users USER 1 and USER 2 previously conducted. USER 1 conducted a search that was recorded as search record 64 including documents DOC A, DOC B, DOC C, and DOC D, and USER 2 conducted a search that was recorded as search record 66 including documents DOC A, DOC B, DOC E, and DOC F. Note that, although both search records 64, 66 are stored in a single database 62, the process is also operable when multiple storage devices are accessible and store search records.

A user USER 3 conducting a search session 68 has already associated document DOC A and indicates 70 this document ID to a search tool 20. The search tool 20 searches 74, 75 (or alternatively instructs 74, 75 the database 62 to search) search records stored in the database 62 in which document DOC A is recorded and finds 76, 77 that DOC A is recorded in search record 64 conducted by USER 1 and in search record 66 conducted by USER 2. The search tool 20 further finds 76, 77 that both search records 64, 66 include DOC B, also. That is, the search tool 20 found information linking document DOC A to document DOC B. Accordingly, the search tool 20, sends 78 a suggestion, to USER 3, to associate DOC B to his search record, also.

The rationale for executing the first linking process is that multiple prior users collecting the same document(s) (first documents) have already determined that the same additional document(s) should be collected, also. Thus, when another user indicates to the search tool 20 that same first document(s), the suggesting tool 201 should suggest that the user collect also the second (additional) document(s).

In another scenario, a user generating one or more search records that include the same set of documents together implies that the same user conducting a new search including a document(s) from the set would likely be interested in marking more documents from the same set. The first linking process can suggest documents accordingly. Also, the process can be implemented so that, for a user conducting a new search, suggestions based on past search records that the user himself/herself recorded receive higher priority.

Variations of this process are within the scope of the invention. For example, the search tool 20 may suggest a second document when it found only one prior search record in which the first document is included. Another example variation is that the search tool may require finding more than one common document to suggest for inclusion in a session.

The steps for the first linking process can be encompassed by the following description: search storage (such as database 62) for at least one search record that includes at least one document that a user (such as USER 2) indicates (such as document DOC A, document DOC B, and document DOC C); find in the storage at least one search record (such as search record 64 and/or search record 66) that in which such document(s) are included; find at least one document (such as document DOC B) included also in the search record(s) found in the storage; and suggest to the user conducting the search that he/she indicate the newly-found document(s). Search records are recordings of other search sessions.

Figure 5B:
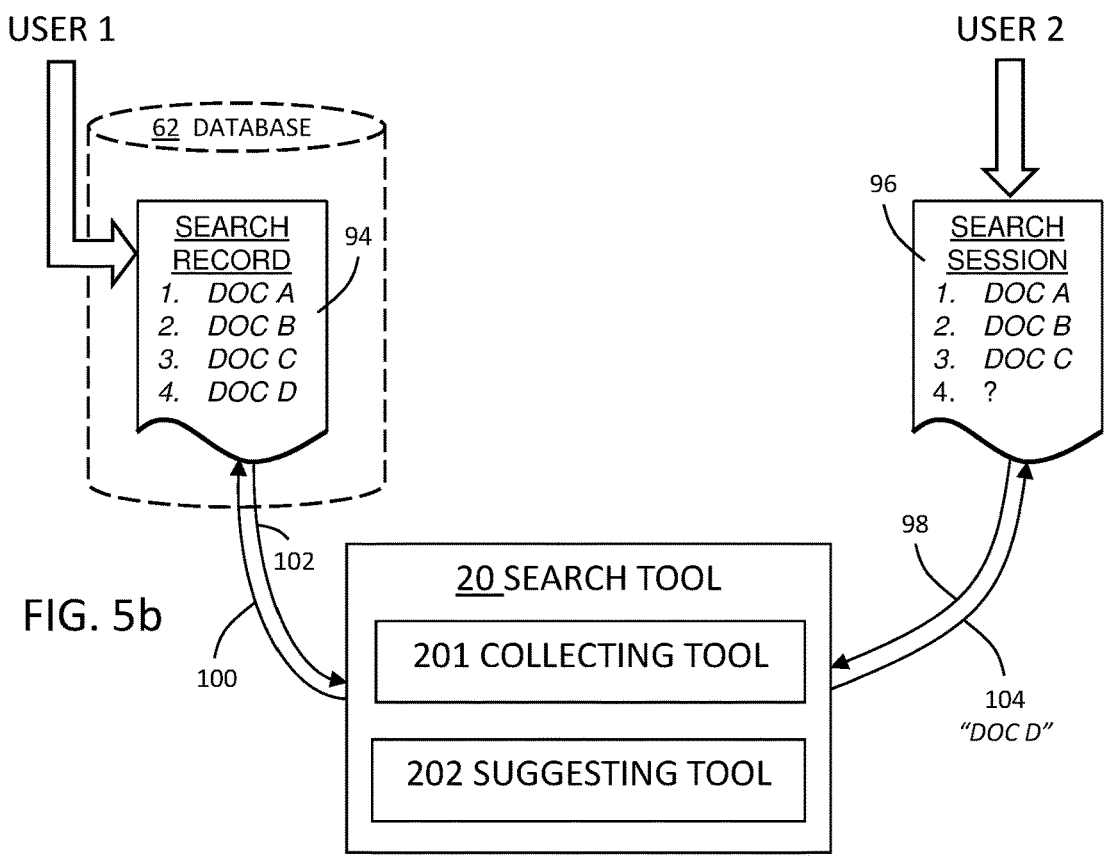
FIG. 5b illustrates the interaction of an embodiment of the search tool with a user and storage while implementing a second linking process in which documents from the first set are recorded with documents of the second set in single other session.

The second linking process for using the storage to find linking information is described with reference to FIG. 5b. In this process documents from the first set are recorded with documents of the second set in single other session;

In this example, the storage is the database 62 holding a search record 94 that user USER 1 previously recorded. The user didn't necessarily know that is session was recorded and didn't necessarily intend to indicate to the search tool that his session should be started, stopped or saved. The search record 94 includes documents DOC A, DOC B, DOC C, and DOC D.

A user USER 2 conducting a search session 96 selects documents DOC A, DOC B, and DOC C and indicates 98 these documents to the collecting tool 201 of the search tool 20. The user didn't necessarily know that is session was started and didn't necessarily intend to indicate to the search tool that his session should be started or saved. The search tool 20 searches 100 (or alternatively instructs 100 the database 62 to search) for search records stored in the database 62 that also include documents DOC A, DOC B, and DOC C and finds 102 that the search record 94 recorded by USER 1 includes documents DOC A, DOC B, and DOC C. The search tool 20 further finds 102 that search record 94 include document DOC D, also. That is, the search tool 20 found information linking documents DOC A, DOC B, and DOC C to document DOC D. Accordingly, the search tool 72 sends 104 a suggestion to USER 2 to select DOC D, also.

Variations of this process are within the scope of the invention. For example, the search tool may require finding fewer or more common documents before it suggests an additional document for inclusion in a search record.

The steps for the second linking process can be encompassed by the following description: search storage (such as database 62) for at least one search record that includes at least one document that a user (such as USER 2) indicates (such as document DOC A, document DOC B, and document DOC C); find in the storage a single search record (such as search record 94) that include at least one of the indicated documents; find the at least one document (such as document DOC D) included also in the search record found in the storage; and suggest to the user conducting a search that he/she include the newly-found document(s).

Figure 5C:
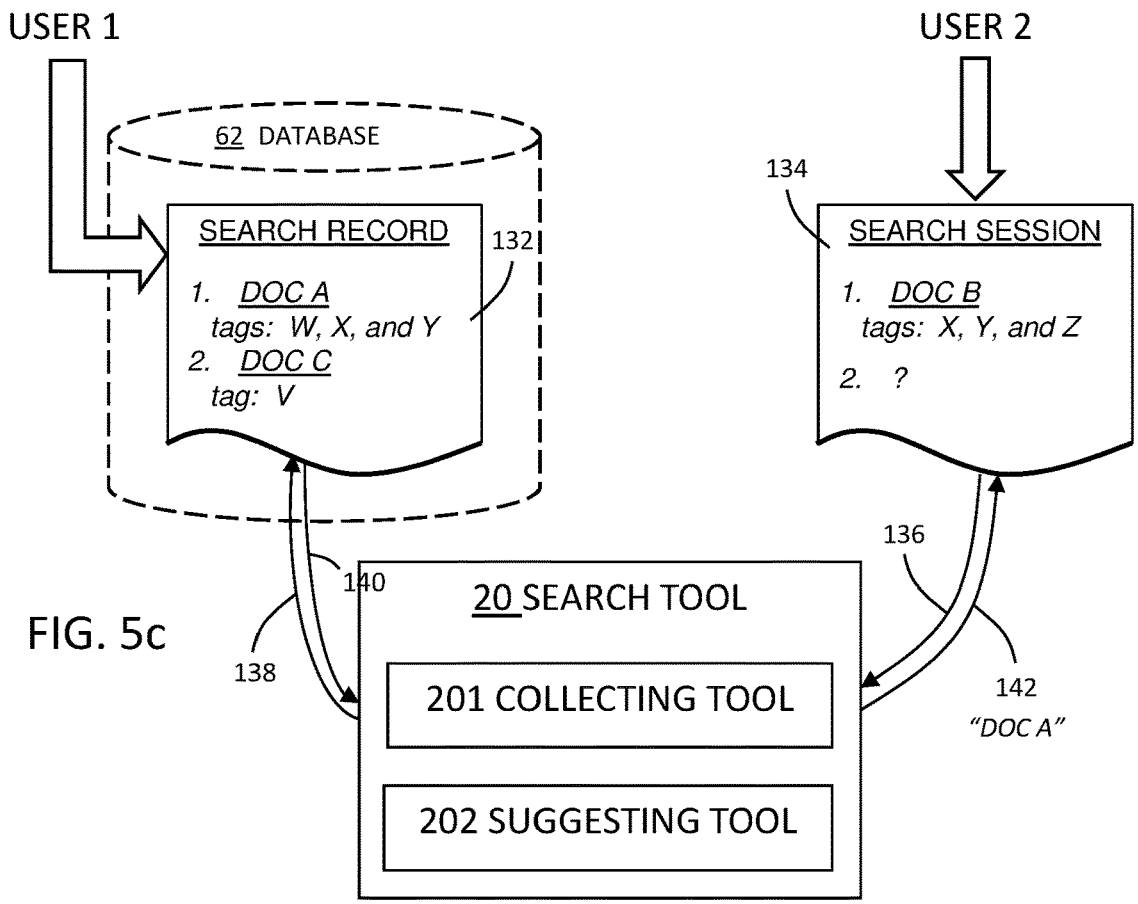
FIG. 5c illustrates the interaction of an embodiment of the search tool with a user and storage while implementing a third linking process in which metadata of documents from the first set is associated with documents or document that are recorded with documents of the second set in other sessions.

The third linking process for using the storage to find linking information is described with reference to FIG. 5c. In this process metadata of documents from the first set is associated with documents or with document that are recorded with documents of the second set in other sessions; Example of metadata could be: classifications, dates, names, cited references, citing references, tags, category etc.

In this example, the metadata are tags that provide descriptive information about the content of documents. Here, the storage, the database 62, holds a search session 132 that include a document DOC A that a user USER 1 tagged with tags TAG W, TAG X, and TAG Y.

A user USER 2 conducting a search session 134 has already marked a document DOC B and then indicates 136 the document to the search tool 20. The document DOC B has the tags TAG X, TAG Y, and TAG Z, and these tags are also indicated 136 to the search tool 20. DOC B may have been previously tagged as indicated the user USER 2, or DOC B may have been tagged by the use of the collecting tool 201 or by an external system, which may have generated or calculated the tags automatically. Perhaps a different user of the search tool 20, the search engine 74 or the reporting tool 72, tagged the document DOC B.

The search tool 20 searches 138 (or alternatively instructs 138 the database 62 to search) the database 62 for search records that are associated with metadata or for search records that include documents that are associated with at least some of the same metadata as those of the documents DOC B marked by the user USER 2 in the search session 134, and the search tool 20 finds 140 the search record 132 that include the document DOC A. That is, the search tool 20 finds information linking document DOC A to document DOC B. Accordingly, the search tool 20 sends 142 a suggestion to the user to mark DOC A, also. (search session might also have associated metadata and therefore if the search tool 20 found a search record that was associated with at least some of the same metadata as those of the user USER 2 search session 134 or as those of document DOC B marked by the user USER 2 in the search session 134, the suggesting tool 202 would send a suggestion to the user USER 2 to mark also the documents included in that search record.)

The steps for the third linking process can be encompassed by the following description: with at least one document that a user (such as the user USER 2) indicates (such as document DOC B), having associated metadata (such as tags TAG X, TAG Y, and TAG Z), search the storage (such as the database 62) for at least one search session that include at least one document that has at least some of the same associated metadata that the document of the first set has; and find in the storage the at least one such search record (such as search record 132); and suggest to the user conducting a search session (such as search session 134) that he/she indicate the newly-found document(s) also.

In some implementations, even untagged or wrongly-tagged documents might also be suggested, if they were included in a search record in which other documents are tagged with the relevant tags. A document DOC C in the search record 132 has tag V, which is not a tag in the search session 134 that the user USER 2 is conducting. However, because it is in the search record 132, which does have relevant tags, this implementation will suggest also the document DOC C to the user USER 2 for inclusion in the search session 134.

Figure 5D:
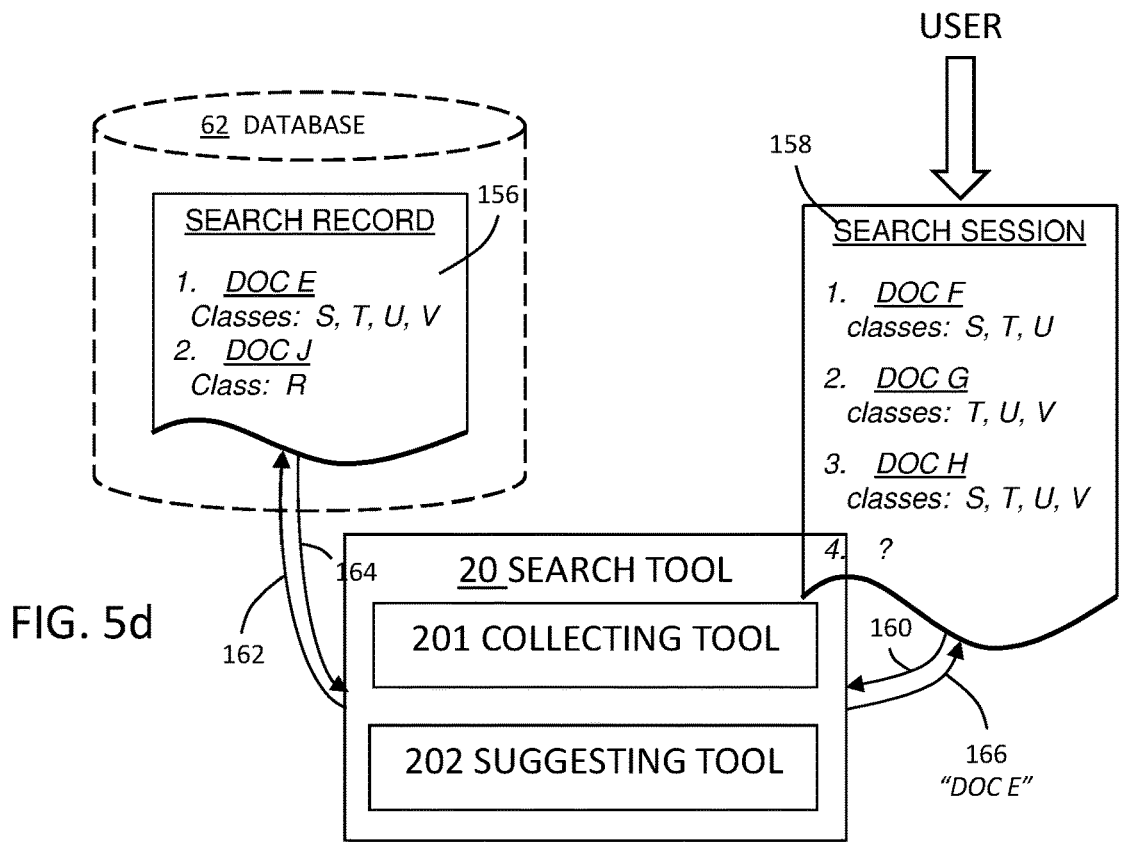
FIG. 5d illustrates the interaction of an embodiment of the search tool with a user and storage while implementing a forth linking process in which structured content (illustrated in the example fig.) of documents from the first set is found in documents of the second set or document that are recorded with documents (illustrated in the example fig.) of the second set in other sessions.

The forth linking process for using the storage to find linking information is described with reference to FIG. 5d. In this process structured content of documents from the first set is found in documents of the second set or document that are recorded with documents of the second set in other sessions; Examples of structured content could be: classifications, dates, inventors, applicants, cited references etc. structured content might be extracted from a database or from the documents themselves, e.g. by OCR or by parsing tools.

In this example, the storage, a database 62, holds a search session 156 that includes a document DOC E, which has been classified in classes S, T, U, and V.

A user USER conducting a search session 158 has already indicated documents DOC F, DOC G, and DOC H. The document DOC F is classified in classes S, T, and U, the document DOC G is classified in classes T, U, and V, and the document DOC H is classified in classes S, T, U, and V. These documents are indicated 160 by the user USER to the collecting tool 201 of the search tool 20.

The search tool 20 observes that three documents included in the search session 158 are all classified in classes T and U and further that each is classified also in class S and/or V. The search tool 20 searches 162 (or alternatively instructs 162 the database 62 to search) the database 62 for search records that are classified or for search records that include documents that are classified in both classes T and U and also in at least one of classes S and V. Accordingly, the search tool 20 finds 164 the search record 156, which includes the document DOC E. That is, the search tool 20 finds information linking the document DOC E to documents DOC F, DOC G, and DOC H. Consequently, the search tool 20 sends 166 a suggestion to the user to include the document DOC E, also.

Variations of the preceding example are within the scope of the invention. For example, the search tool 20 may use the classifications of fewer or more documents included in the search session 158 as the basis for its search in the database 62. Also, the search tool 20 may use fewer or more common classifications of the documents included in the search session 158 as the basis for its search in the database 62.

The steps for the fourth linking process can be encompassed by the following description: with at least one document that a user (such as the user USER in FIG. 12) indicates (such as documents DOC F, DOC G, and DOC H), the document(s) contains structured data, search storage (such as database 62) for at least one search record that includes at least one document that contain at least one of the same structured data; find in the storage the at least one such search record (such as the search record 156), the search record including such document(s) (such as DOC E); and suggest to the user conducting the search session (such as search session 158) that he/she include the newly-found document(s).

In some implementations, the search tool 20 may be configured to suggest including documents that are unclassified or wrongly classified, if the document was included in a search session in which other documents are classified in a fashion to be suggested. For example, the search record 156 includes a document DOC J that is classified in class R. Although none of the documents in the search session 158 are classified in class R, an implementation may be configured to suggest the document DOC J because it is in the same search record as the document DOC E, which has classifications in common with documents in the search session 158.

Figure 5E:
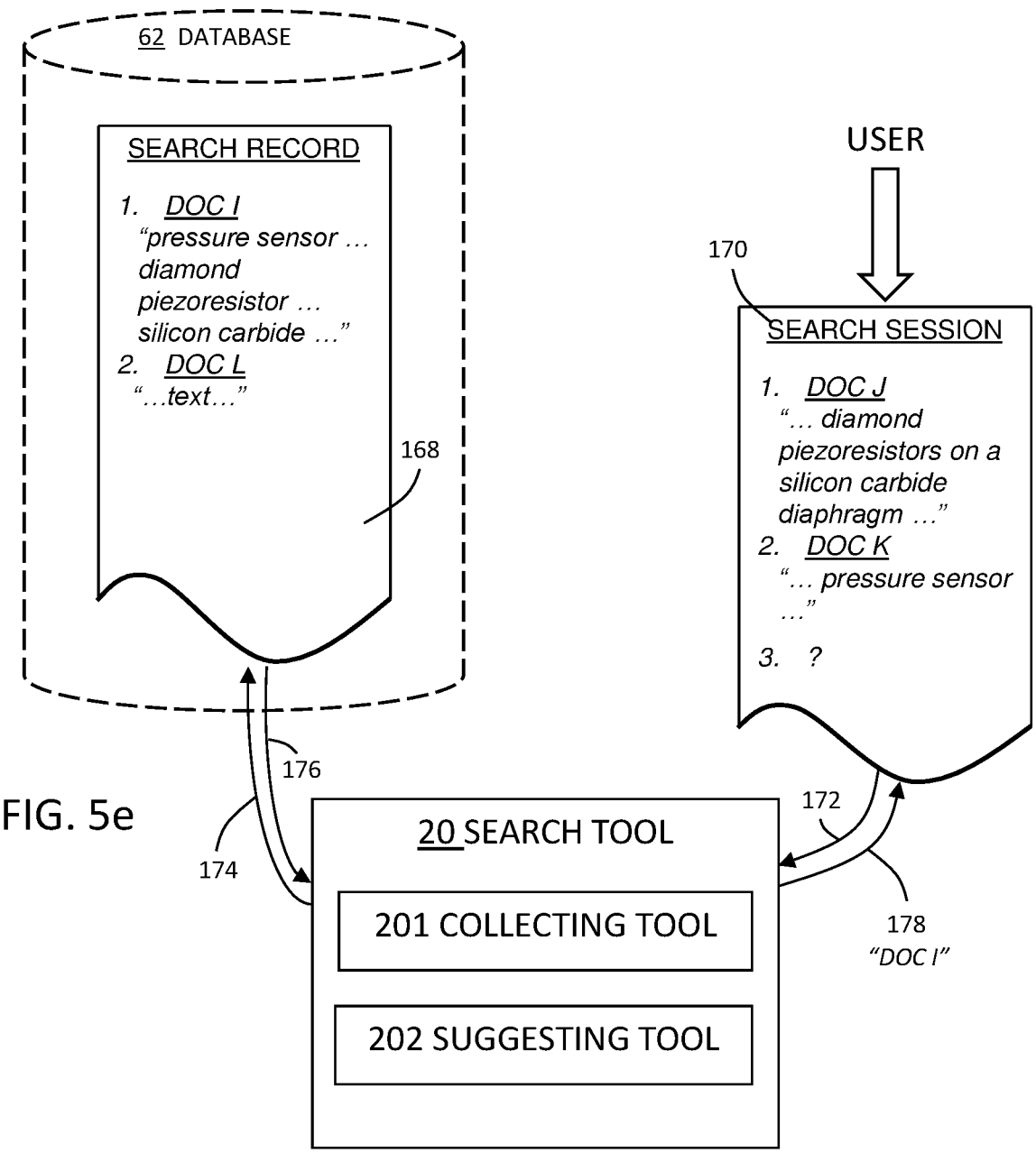
FIG. 5e illustrates the interaction of an embodiment of the search tool with a user and storage while implementing a fifth linking process in which content found in documents from the first set is similar to content found in documents of the second set or document that are recorded with documents of the second set in other sessions.

The fifth linking process for using the storage to find linking information is described with reference to FIG. 5e. In this process content found in documents from the first set is similar to content found in documents of the second set or document that are recorded with documents of the second set in other sessions;

In this example, the storage, a database 62, holds a search record 168. Search record 168 includes document DOC I 168 that includes the text strings "pressure sensor . . . diamond piezoresistor . . . " and " . . . silicon carbide . . . ". Search record 168 also includes document DOC L that includes the some other text.

A user USER conducting a search session 170 collects a document DOC J and a document DOC K. The document DOC I discusses building a pressure sensor by affixing diamond piezoresistors on a silicon carbide diaphragm. Within the document DOC J, a section discusses building a torque sensor by affixing diamond piezoresistors on a silicon carbide diaphragm. More specifically, the document DOC J includes the phrase " . . . diamond piezoresistors on a silicon carbide diaphragm . . . " but does not necessarily includes the phrase " . . . pressure sensor . . . " The document PUBN' K discusses pressure sensors, but not necessarily by affixing diamond piezoresistors on a silicon carbide diaphragm. The user USER indicates 172 the document DOC J and DOC K to the collecting tool 201 of the search tool 20.

The search tool 20 observes that the document DOC J includes the phrase " . . . diamond piezoresistors on a silicon carbide diaphragm . . . " and that the document DOC K includes the phrase "pressure sensor." Accordingly, the search tool 20 decides to search 174 the database 62 (or alternatively instructs 174 the database 62 to search) for documents that contain the text strings "diamond piezoresistor," "silicon carbide," and "pressure sensor." The search tool 20 finds 176 the document DOC I. That is, the search tool 20 finds information linking the document DOC I to the documents DOC J and DOC K. Consequently, the suggesting tool 201 of the search tool 20 sends 178 a suggestion to the user to include the document DOC I, also.

Variations of the preceding example are within the scope of the invention. For example, the search tool 20 may search storage based on fewer or more text strings and/or their frequency in the documents. Also, the search tool 20 may use common text strings of one or more documents included in the search session 170 as the basis for its search in the database 62.

The steps for the fifth linking process can be encompassed by the following description: identify one or more phrases of text (such as " . . . diamond piezoresistors on a silicon carbide diaphragm . . . ") from at least one document (such as the document DOC J) that a user (such as the user USER in FIG. 13) indicates; search storage (such as the database 62) for at least one other document having at least one of the same phrases; find in the storage at least one other such document (such as the document DOC I); and suggest to the user conducting the search session (such as the search session 170) that he/she collect the newly-found document(s).

In some implementations, the search tool 20 may be configured to suggest including documents that doesn't contain similar text strings, if the document was included in a search session in which other documents content contain a text in a fashion to be suggested. For example, the search record 168 includes a document DOC L that is contain some other text that is not part of the text of the documents that were indicated in search session 170. Although none of the documents in the search session 170 contain text phrases similar to those of DOC L, an implementation may be configured to suggest the document DOC L because it is in the same search record as the document DOC I, which has content in common with documents in the search session 170.

The preceding discussions presented algorithms that may be executed by themselves to use storage to find information that links documents in a first set to documents in a second set. In alternate embodiments, though, multiple algorithms, which each search for information that links documents of a first set to documents of a second set, may be executed. In this scenario, multiple suggestions for including documents are sent to the client computer, and those suggestions may be prioritized according to which algorithm provided an individual suggestion.

In some embodiments of the invention, the suggested documents of the second set are presented according to one or more priority schemes. For example, with reference above to the discussion of the document first linking process and to FIG. 5a, the existence in a database of search records including both document DOC A and document DOC B causes a search tool to suggest the document DOC B if a user has already included the document DOC A. However, the search tool implementing the document first linking process may determine that at least one other document DOC C should be suggested, so the suggestions are prioritized as to which document is more likely to be of interest to the user. Examples of such prioritization are discussed as follows:

The suggestions may be prioritized according to the number of search records in which a suggested document was included. For example, a document included in five different older search records stored in a database would have a higher priority than a document included in only two search records.

The suggestions may be prioritized according to the user who included a document of the second set in a search record and the user who includes a document of the first set. Example users might be search tool users, search engine users, reporting tool users etc. The prioritization might rely on the user data, such as user profile. For example a search session that was done by a patent examiner will get higher score than a search session that was done by a private inventor. For example, with reference to FIG. 5a, if the user USER 1 works in the same organization with the user USER 3, who has already included the document DOC A, and another document DOC C was included with the document DOC A by user USER 1 in past search records stored in a database, DOC C will have a higher priority than a different document DOC E that was included by a third user USER 2 in a search record stored in a database, if USER 2 is not part of the same organization.

The suggestions may be prioritized according to the order that documents are ordered in the search record or session.

The suggestions may be prioritized according to the similarity of the suggested documents to content of documents in the first set.

The suggestions may be prioritized according to the metadata associated with a document of the second set and the metadata associated documents of the first set. An example is a document in the first set tagged with tags W, X, and Y, one document in the second set tagged with tags W and X, and another document in the second set tagged with tag W. The first document in the second set would have a higher prioritization, because it has more tags in common with the document in the first set.

The suggestions may be prioritized according to the similarity of text of the suggested document to text of documents in the first set. Methods of comparing the text of documents are well known in the art. One example is a document in the first set having the text "a pressure sensor having a silicon carbide diaphragm with diamond piezoresistors thereon," one document in the second set having the text "a pressure sensor having a silicon carbide diaphragm," and another document in the second set having the text "a pressure sensor." The first document in the second set would have a higher prioritization, because its text is more similar to that of the document in the first set.

The suggestions may be prioritized according to the order in which the first set is ordered. For example, if the first set include documents A listed first, B listed second, and C listed third and two documents D, E to be suggested from the second set were found with information that links the document A of the first set to document D of the second set and with information that links the document B of the first set to document E of the second set, the document D having the links to document A of the first set would have a higher priority than document E, because it was found to be related to a document that is assumed to be more important to the user who created the first set.

The invention may further be embodied as a machine readable medium holding instructions. The instructions, when executed, activate a processor to execute a method of designating documents associate with a search session. In terms of the logical designations of first and second storage (discussed above), the machine readable medium of the present embodiment provides the first storage.

As non-limiting examples, the machine readable medium could be embodied as the hard drive 24 of the server 16 of FIG. 3a, the processor could be embodied the processor 22 of the server 16 of FIG. 3a, and the method of designating documents to associate with a search session could be the method represented by the flowchart 46 of FIG. 4. Alternatively, the machine readable medium of the present embodiment may be an external hard drive in operative communication with a server, or the machine readable medium any of various types of non-volatile memory, such as flash memory, read-only memory (ROM), programmable read-only-memory (PROM), electronically-erasable read-only-memory ($E^2ROM$), or equivalent non-transitory storage media. The machine readable medium may be maintained by an independent party for distribution of the instructions (embodied as software code) to others upon request.

Additional variations of the above-described embodiments are within the scope of the invention. For example, the invention does not need to be embodied as a tool on a centrally-hosted website. The invention may be embodied instead as local software installed on personal computers in communication with associated software on web-accessible servers. Alternatively, the invention may embodied as a web service to be used by a third party computer program through an application programming interface (API). The invention may also be embodied as a smartphone application that, when installed on a user's smartphone, communicates with the server. The invention may further be embodied as a software extension, for example, installed on web browsers, that communicates with the server. Further, the invention may be embodied as an embedded code snippet that a third party installs on an application, and the code snippet communicates with the server.

The invention may be embodied to work in conjunction with reporting tools, citation management software, docketing software, Information Disclosure Statement (IDS) generation software, and search engines.

Citation management software is a software that scholars and authors use to record and utilize bibliographic citations (references). Examples of such software include EndNote® (a personal computer-based program), RefWorks (an online research management, writing, and collaboration tool), Zotero (an open source reference management software browser extension that manages bibliographic data and related research materials extension), and Aigaion (also open source reference management software that manages bibliographic data and related research materials). A documents folder may be designated to be reported and therefore the invention can be embodied to suggest additional documents to add to the folder. The suggested additional documents are related to the documents already in the folder.

Examples of docketing software include IPfolio (http://www.ipfolio.com) and ProLaw (http://www.elite.com/prolaw).

An example of IDS generation software (software that prepares IDSs) is known as "IDS Generator" (available at http://www.maxval.com/patent-tools-ids-generator.html).

Example search engines include for example those that have the additional functionality of enabling the marking of documents and further can export the marked documents. One such search engine is that provided by the European Patent Office (EPO). (See "My patents list" at http://worldwide.espacenet.com.) Marked documents in a designated list are the document to be collected, and the search engine can suggest additional documents to add to the list, the suggested additional documents being related to the documents marked already.

In some embodiments of the invention, the user receives document information, such as patent number and issue date, as suggestions of documents to include in a search session, but the invention is not limited accordingly. For example, embodiments may provide additional information, such as titles, abstracts, relevant text, inventor or author names, images, and so on. Embodiments may also provide additional information, such as reasons the suggested documents are suggested, relation scores that will indicate to the user how important the suggested document is, and so on. The information may be provided in a pre-designated format with standard fields.

In some embodiments of the invention, if the user decides to collect a document, e.g., the suggested document(s), the document information, such as patent number and issue date, is included in the search record.

In some other embodiments of the invention, if the user decides to collect a document, e.g., the suggested document(s), additional information is retrieved from a database to be included in the search record. For example, embodiments may provide additional information, such as title, abstract, relevant text, inventor or author names, images, and so on. The information may be provided in a pre-designated format with standard fields.

In some embodiments of the invention, the user is able to filter the suggested documents or the documents from which they will be derived. That is, the user may specify criteria for which documents in the first set must fulfill before they may serve as the bases upon which additional documents may be suggested, and/or the user may specify criteria that documents must fulfill before they would be suggested as additional documents. Non-limiting examples of such filters for the second set are as follows:

A user specifies that he wants suggestions only from search records that were created in the last year, by certain group of users, from a certain data source, etc.

A user specifies that he wants suggestions only of documents that were published prior to a specific date, contain certain words, classifies in a specific class, etc.

Non-limiting examples of such filters for the first set include:

A user specifies that he wants suggestions that are based only on, i.e., related only to, the first three (3) collected documents of the session.

A user specifies that he wants suggestions that are based only on, i.e., related only to, new documents that were added to the search session at a specified time frame.

Having thus described exemplary embodiments of the invention, it will be apparent that various alterations, modifications, and improvements will readily occur to those skilled in the art. For example, the invention is not limited to the above linking algorithms. For instance, documents that may be suggested may include forward citations (newer documents which cited a document already in a search record) and backward citations (older citations that are cited by a document already in a search record). The invention is not limited to using a linking algorithm. An example of implementing the invention without a linking algorithm is storage that stores at least an index file or a database in which document IDs are linked or ranked with respect to one another and the search tool is suggesting documents based on those links. Alternations, modifications, and improve- ments of the disclosed invention, though not expressly described above, are nonetheless intended and implied to be within spirit and scope of the invention. Accordingly, the foregoing discussion is intended to be illustrative only; the invention is limited and defined only by the following claims and equivalents thereto.

The invention claimed is:

1. A method of designating documents to associate with a search record, the method comprising:
   providing a search tool (20) connected to a client device (44a, 44b, 44c), a server (16) and a database, wherein said search tool (20) includes a collection tool (201) and a suggesting tool (202);
   opening a search session by means of said search tool (20) in response to a request received from a client device (44a, 44b, 44c);
   storing a search record related to said search session; and
   receiving from the client device (44a, 44b, 44c) an indication of a first set of one or more documents as basis for the search and for storing in said collection tool (201);
   wherein said search tool (20) uses information from at least said database to find information that links at least one of the documents in the collection tool (201) to one or more documents of a second set of documents;
   wherein said search tool (20), by means of a suggesting tool (202), presents a suggestion of said second set of documents to the client device (44a, 44b, 44c);
   wherein the client device (44a, 44b, 44c) chooses one or more of the documents presented by the suggesting tool (202) to enable associating one or more document of the second set with said collection tool (201);
   wherein the said using information from at least said database includes:
      searching the database for one or more documents that are at least one document of the first set;
      finding in the database the one or more other session records that includes at least one document of the first set; and
      finding the at least one document of the second set included also in the one or more other session records found in the database that includes at least one document of the first set; and
   wherein the suggested documents of the second set are prioritized according to the number of other session records in which a document of the second set was included with documents of the first set.

2. A method according to claim 1, wherein said search tool (20) also generates a unique session ID of a search session to be stored in said database that will be associated with the documents of said collection tool (201), wherein any of the documents of the second set are associated with other session ID's.

3. A method of designating documents to associate with a search record of claim 2, wherein the opening of the search session comprises:
   receiving from the client device (44a, 44b, 44c) said unique session ID instead of generating it; and
   retrieving from the database indication of a set of one or more documents that are associated with said session ID, the retrieved set being a part of the first set.

4. The method of designating documents to associate with a search record of claim 2, wherein after the presenting a suggestion to the client device (44a, 44b, 44c) to associate the documents of the second set with the search record, upon request from the client device, associating one or more of the documents suggested in the second set with the search record;
   having the server (16) reiterating the search based on said first set of documents and the new associated documents out of the second set of documents; and
   having the suggesting tool (202) presenting a new suggestion;
   said reiteration also based on the information of said other session ID's.

5. A method of designating documents to associate with a search record of claim 4, wherein the opening of the search session comprises:
   receiving from the client device (44a, 44b, 44c) said unique session ID instead of generating it; and
   retrieving from the database indication of a set of one or more documents that are associated with said session ID, the retrieved set being a part of the first set.

6. The method of designating documents to associate with a search record of claim 1, wherein after the presenting a suggestion to the client device (44a, 44b, 44c) to associate the documents of the second set with the search record, upon request from the client device, associating one or more of the documents suggested in the second set with the search record;
   having the server (16) reiterating the search based on said first set of documents and the new associated documents out of the second set of documents; and
   having the suggesting tool (202) presenting a new suggestion;
   said reiteration also being based on the information of said other session records.

7. A method of designating documents to associate with a search record of claim 6, wherein the opening of the search session comprises:
   receiving from the client device (44a, 44b, 44c) said unique session ID instead of generating it; and
   retrieving from the database indication of a set of one or more documents that are associated with said session ID, the retrieved set being a part of the first set.

8. The method of claim 1 wherein said search tool (20) is also operative to receive, store and/or restore at least one of: user related data, search related data and document related data.

9. The method of claim 1, wherein the search tool (20) is integrated into a search engine.

10. The method of claim 1, wherein the search tool (20) is used for creating, editing and/or delivering search results.

11. The method of claim 1, wherein said receiving from the client device (44a, 44b, 44c) an indication of a first set is done by a user marking one or more documents out of one or more documents that were presented to the user in response to a search query.

12. The method of claim 1, wherein said search session is a session between actions that are activated on most of the documents in said selected set of documents.

13. The method of claim 12, wherein said actions are one of export, save, share, clear and/or print.

14. The method of claim 1,
   wherein at least one document of the first set has associated metadata; and
   wherein said using information from at least said database further includes:
      searching the database for one or more other session records that includes at least one document that has at least some of the same associated metadata that the document of the first set has; and finding in the database the one or more other session records, the documents included therein being from the second set.

15. The method of claim 14, wherein said metadata is retrieved from a different storage.

16. The method of claim 1, wherein said using information from at least said database further includes:
identifying one or more phrases of text from at least one document content of the first set;
searching the database for one or more other session records that includes at least one document having at least one document content of the same phrases; and
wherein in the database for one or more other session records, the documents included therein are from the second set.

17. The method of claim 16, wherein said content is retrieved from a different storage.

18. The method of claim 1, wherein a first party hosts the collection tool, and an independent second party hosts the server and the database.

19. The method of claim 1, wherein a first party operates the collection tool and an independent second party hosts one or more of the databases and uses the databases according to instructions from the first party.

20. The method of claim 1,
wherein using information from at least said database includes executing multiple algorithms that each searches for the information, and
wherein multiple suggestions for including documents are sent to the client computer, the suggestions being prioritized according to which algorithm provided an individual suggestion.

21. The method of claim 1, wherein the suggested documents of the second set are further prioritized according to at least one of:
the number of other session records in which a document of the second set was included;
the information about the one or more users who included a document of the second set in the one or more other session records and information about the user who included a document of the first set in the session record;
the information about the one or more users who included a document of the second set in the one or more other session records and the information about the one or more users who included a document of the first set in the same other session record;
the category in which a document of the second set was categorized in the one or more other session records and the category in which a document of the first set was categorized in the same other session record;
the search features to which a document of the second set was indicated as relevant in the one or more other session records and the search features to which a document of the first set was indicated as relevant in the same other session record;
the search session in which a document of the second set was added to a the one or more other session records and the search session in which a document of the first set was included to the same other session record;
the order number in which a document of the second set was included in a one or more other session records and the order number in which a document of the first set was included also in the same other session record;
the metadata associated with a document of the second set and metadata associated documents of the first set;
the similarity of text of a document of the second set to text of documents of the first set;
the classifications of documents of the second set and the classifications of documents of the first set; and
the order in which documents in the first set are listed.

22. The method of claim 1, wherein the one or more session records that includes at least one document of the first set was recorded during a search session of a different user.

* * * * *